(12) United States Patent
Maas et al.

(10) Patent No.: US 7,575,063 B2
(45) Date of Patent: *Aug. 18, 2009

(54) AERATING A GROUND SURFACE

(75) Inventors: David R. Maas, Owatonna, MN (US); Scott W. Bjorge, Owatonna, MN (US)

(73) Assignee: PlanetAir Turf Products, LLC, Owatonna, MN (US)

( * ) Notice: Subject to any disclaimer, the term of this patent is extended or adjusted under 35 U.S.C. 154(b) by 145 days.

This patent is subject to a terminal disclaimer.

(21) Appl. No.: 11/676,547

(22) Filed: Feb. 20, 2007

(65) Prior Publication Data
US 2007/0131435 A1 Jun. 14, 2007

Related U.S. Application Data

(63) Continuation of application No. 10/866,939, filed on Jun. 14, 2004, now Pat. No. 7,204,317.

(60) Provisional application No. 60/543,225, filed on Feb. 10, 2004.

(51) Int. Cl.
*A01B 45/00* (2006.01)
(52) U.S. Cl. ........................................ 172/22
(58) Field of Classification Search ............ 172/21, 172/22, 75, 174, 177, 540, 541, 544, 545, 172/668
See application file for complete search history.

(56) References Cited

U.S. PATENT DOCUMENTS

| 502,301 A | 8/1893 | Kime |
|---|---|---|
| 1,362,409 A | 12/1920 | Forker |
| 1,704,986 A | 3/1929 | Marcy |
| 1,955,937 A | 4/1934 | Allen |
| 1,965,510 A | 7/1934 | Porter |
| 2,041,208 A | 5/1936 | Rienks |
| 2,111,478 A | 3/1938 | McGuire |
| 2,347,748 A | 5/1944 | Melling |
| 2,591,572 A | 4/1952 | Mascaro |
| 2,700,926 A | 2/1955 | Goit |
| 2,778,291 A | 1/1957 | Kerns |
| 3,143,090 A | 8/1964 | Cecil et al. |
| 3,148,737 A | 9/1964 | Lunsford |
| 3,393,751 A | 7/1968 | Mascaro |
| 3,522,965 A | 8/1970 | Indzeoski |

(Continued)

OTHER PUBLICATIONS

PlanetAir Aerator, "Aerate, Mow, then Putt in just 15 minutes . . . ", Brochure, PlanetAir Turf Products, LLC—believed to have been publicly available before Aug. 11, 2003.

(Continued)

*Primary Examiner*—Thomas B Will
*Assistant Examiner*—Jamie L McGowan
(74) *Attorney, Agent, or Firm*—Fish & Richardson P.C.

(57) ABSTRACT

Certain embodiments of the invention include an aerator that provides a shifting means adapted to alter the path of the aeration tines so that they do not impact the ground surface, the shifting being effected without lifting the entire aerator from the ground surface. Some embodiments of an aerator further include an energy modulation system that is capable of relieving a shock to the gear system caused by an aeration tine impacting debris, rocks or a hardened portion in the ground 26 Claims, 10 Drawing Sheets

U.S. PATENT DOCUMENTS

| | | | |
|---|---|---|---|
| 3,534,818 | A | 10/1970 | Mascaro |
| 3,586,109 | A | 6/1971 | Eversole et al. |
| 3,650,331 | A | 3/1972 | Dedoes |
| 3,707,132 | A | 12/1972 | Hansen |
| 3,797,577 | A | 3/1974 | Killion et al. |
| 3,877,401 | A | 4/1975 | Gutman |
| 3,939,917 | A | 2/1976 | Reed, Jr. et al. |
| 3,993,143 | A | 11/1976 | Moreland, Jr. |
| 4,020,907 | A | 5/1977 | Luck |
| 4,081,034 | A | 3/1978 | Hines |
| 4,084,642 | A | 4/1978 | Killion |
| 4,148,362 | A | 4/1979 | Orth |
| 4,154,305 | A | 5/1979 | Prewett |
| 4,158,391 | A | 6/1979 | Clements |
| 4,192,387 | A | 3/1980 | Stinson |
| 4,212,357 | A | 7/1980 | Clements et al. |
| RE30,705 | E | 8/1981 | Hines |
| 4,326,591 | A | 4/1982 | Dedoes |
| 4,336,760 | A | 6/1982 | Cohen et al. |
| 4,383,580 | A | 5/1983 | Huxford |
| 4,489,787 | A | 12/1984 | Gary |
| 4,538,689 | A | 9/1985 | Dietrich, Sr. |
| 4,550,783 | A | 11/1985 | Hansen |
| 4,619,329 | A | 10/1986 | Gorbett |
| 4,632,189 | A | 12/1986 | Rizzo |
| 4,662,456 | A | 5/1987 | Classen |
| 4,699,220 | A | 10/1987 | Strohm |
| 4,723,607 | A | 2/1988 | Hansen |
| 4,773,486 | A | 9/1988 | Huber et al. |
| 4,776,404 | A | 10/1988 | Rogers et al. |
| 4,791,995 | A | 12/1988 | Hochlan, Jr. |
| 4,840,232 | A | 6/1989 | Mayer |
| 4,867,244 | A | 9/1989 | Cozine et al. |
| 4,881,602 | A | 11/1989 | Hansen et al. |
| 4,899,828 | A | 2/1990 | Harris |
| 4,910,948 | A | 3/1990 | Nelson |
| 4,924,944 | A | 5/1990 | Cozine et al. |
| 4,926,947 | A | 5/1990 | Cozine et al. |
| 5,014,791 | A | 5/1991 | Kure |
| 5,020,602 | A | 6/1991 | Dellinger |
| 5,029,652 | A | 7/1991 | Whitfield |
| 5,036,655 | A | 8/1991 | Holloway |
| 5,101,910 | A | 4/1992 | Dawson |
| 5,119,880 | A | 6/1992 | Zehrung, Jr. et al. |
| 5,152,348 | A | 10/1992 | Flanagan, Sr. et al. |
| 5,172,768 | A | 12/1992 | Straus |
| 5,207,278 | A | 5/1993 | Hatlen |
| 5,209,306 | A | 5/1993 | Whitfield |
| 5,398,767 | A | 3/1995 | Warke |
| 5,398,768 | A | 3/1995 | Staples |
| 5,460,229 | A | 10/1995 | Mattis |
| 5,469,922 | A | 11/1995 | Bjorge |
| 5,495,895 | A | 3/1996 | Sakamoto |
| 5,570,746 | A | 11/1996 | Jones et al. |
| 5,579,847 | A | 12/1996 | Postema |
| 5,586,603 | A | 12/1996 | Mattis |
| 5,586,604 | A | 12/1996 | Postema |
| 5,615,744 | A | 4/1997 | Krafka |
| 5,623,996 | A | 4/1997 | Postema |
| 5,662,172 | A | 9/1997 | Brown |
| 5,673,756 | A | 10/1997 | Classen |
| 5,680,903 | A | 10/1997 | Oliver |
| 5,690,179 | A | 11/1997 | Dickson |
| 5,709,272 | A | 1/1998 | Jones et al. |
| 5,709,273 | A | 1/1998 | Roth |
| 5,765,645 | A | 6/1998 | Postema |
| 5,769,169 | A | 6/1998 | Miksitz |
| 5,803,181 | A | 9/1998 | Hsu |
| 5,806,293 | A | 9/1998 | Klein et al. |
| 5,816,336 | A | 10/1998 | Underhill |
| 5,823,269 | A | 10/1998 | Leclerc |
| 5,868,206 | A | 2/1999 | Miller |
| 5,906,090 | A | 5/1999 | Knudsen |
| 5,934,055 | A | 8/1999 | Steele |
| 5,937,953 | A | 8/1999 | Melberg et al. |
| 6,003,612 | A | 12/1999 | Knight et al. |
| 6,003,613 | A | 12/1999 | Reincke |
| 6,038,989 | A | 3/2000 | Comer et al. |
| 6,041,869 | A | 3/2000 | Lewis et al. |
| 6,086,520 | A | 7/2000 | Rodriquez |
| 6,102,129 | A | 8/2000 | Classen |
| 6,149,169 | A | 11/2000 | Chelgren |
| 6,179,061 | B1 | 1/2001 | Fiore |
| 6,241,025 | B1 | 6/2001 | Myers et al. |
| 6,273,197 | B1 | 8/2001 | Marlow |
| 6,321,849 | B1 | 11/2001 | Underhill |
| 6,415,872 | B2 | 7/2002 | Myers et al. |
| 6,425,161 | B1 | 7/2002 | LeMeur et al. |
| 6,460,318 | B1 | 10/2002 | Ferris et al. |
| 6,484,811 | B1 | 11/2002 | Edwards |
| 6,513,603 | B2 | 2/2003 | Bjorge |
| 6,543,798 | B2 | 4/2003 | Schaffner et al. |
| 6,659,190 | B2 | 12/2003 | Jessen |
| 6,675,905 | B2 | 1/2004 | Hill et al. |
| 6,684,960 | B1 | 2/2004 | Ng et al. |
| 6,691,791 | B2 | 2/2004 | Bjorge |
| 6,758,283 | B2 | 7/2004 | Lauer et al. |
| 6,805,205 | B1 | 10/2004 | Gabard |
| 7,055,617 | B2 | 6/2006 | Bjorge et al. |
| 7,070,005 | B2 | 7/2006 | Maas |
| 7,096,968 | B2 | 8/2006 | Maas |
| 7,204,317 | B2 * | 4/2007 | Maas et al. .......... 172/22 |
| 7,290,619 | B2 | 11/2007 | Maas et al. |
| 2003/0230417 | A1 | 12/2003 | Maas et al. |
| 2006/0027381 | A1 | 2/2006 | Bjorge et al. |

OTHER PUBLICATIONS

PlanetAir Aerator, "Innovation that improves and protects your piece of the planet . . . ," Bruchure, PlanetAir Turf Products, LLC—believed to have been publicly available before Aug. 11, 2003.

PlanetAir Aerator, "Aerate. Mow. Play.", Brochure, PlanetAir Turf Products, LLC—believed to have been publicly available before Aug. 11, 2003.

* cited by examiner

AERATING A GROUND SURFACE

CROSS-REFERENCE TO RELATED APPLICATION(S)

This application is a continuation of U.S. patent application Ser. No. 10/866,939 (now U.S. Pat. No. 7,204,317) filed on Jun. 14, 2004 by David Maas et al. and entitled "Aerating a Ground Surface," which claims priority to U.S. Provisional Application Ser. No. 60/543,225, filed on Feb. 10, 2004 by David Maas et al. and entitled "Soil Aerator Assembly." The contents of these prior applications is hereby incorporated as if fully set forth herein.

TECHNICAL FIELD

This invention relates to ground aeration using an aerator assembly.

BACKGROUND

Soil aeration is a conventional technique used by groundskeepers to reduce compaction in the ground soil, stimulate plant growth, and promote proper drainage. Soil may become compacted from overuse or environmental effects, which ultimately affects the soil permeability and development of rooted plants within the soil. In particular, compacted soil restricts the amount of oxygen that can enter the soil and the amount of carbon dioxide that can escape. Not all soils are affected equally by overuse and environmental factors. The amount of compaction depends on soil composition, the amount of vegetation, and the moisture content of the soil. Periodic soil aeration relieves the compaction in the soil before the negative effects overburden the soil to the point that it can no longer support desirable vegetation.

In general, soil aerators use end-coring tubes that penetrate the ground and remove "plugs" of soil. When the coring tubes impact hard objects, such as large rocks in the soil, the shock may be absorbed entirely by the coring tubes and the drive system. Because the coring tubes and the drive system are coupled to generally rigid components, the impact with hard objects or a hardened ground surface may retard the motion of the coring tubes and may cause significant damage to the coring tubes or drive components.

Commercial soil aerators conventionally have a three point hydraulic hitch device similar in operational principal to the three point hitches used on commercial snow plows. The three point hitch supports the aerator and serves to raise and lower the device relative to the ground surface. To disengage the coring tubes from the soil, the entire aerator is raised off the ground with the three point hitch. Such hitch systems generally do not pivot, meaning that the aerator does not rotate relative to the tractor. Accordingly, the tractor operator also uses the lift device to lift the entire soil aerator machine from the ground surface before attempting to turn the tractor. Otherwise, the aerator would swing behind the tractor, causing the coring tubes to tear through the soil.

SUMMARY

Certain embodiments of the invention include an aerator that is adapted to shift the path of the aeration tines away from the ground surface without lifting the entire aerator from the ground surface. An aeration apparatus may include a set of aeration tines mounted to a tine rack, the aeration tines being adapted to form aeration pockets in a ground surface. The aerator may further include an adjustment member that is operable to shift the aeration tines between a first operative position and a second operative position. In the first operative position the aeration tines may be operable to contact the ground surface when the tine tack is proximal to the ground surface while in the second operative position the aeration tines may avoid contact with the ground surface without lifting the frame away from the ground surface.

In some embodiments, the aerator includes a gear system that is adjustable between a first timing position and a second timing position. The gear system may be coupled to the aeration apparatus and include at least one gear that guides at least a portion of the aeration tine's motion. When the gear system is adjusted to the first timing position, the aeration tine may be operable to contact the ground surface. When the gear system is adjusted to the second timing position, the aeration tine may be operable to avoid contact with ground surface.

Still other embodiments provide an aerator that is configured to provide relief to the gear system when an aeration tine impacts and penetrates a ground surface. The aerator optionally includes an energy modulation system coupled to a gear system to provide bi-directional shock relief The energy modulation system may have one or more spring devices which are loaded when the aeration tine impacts a hardened portion in the ground.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENTS

Figure 1:
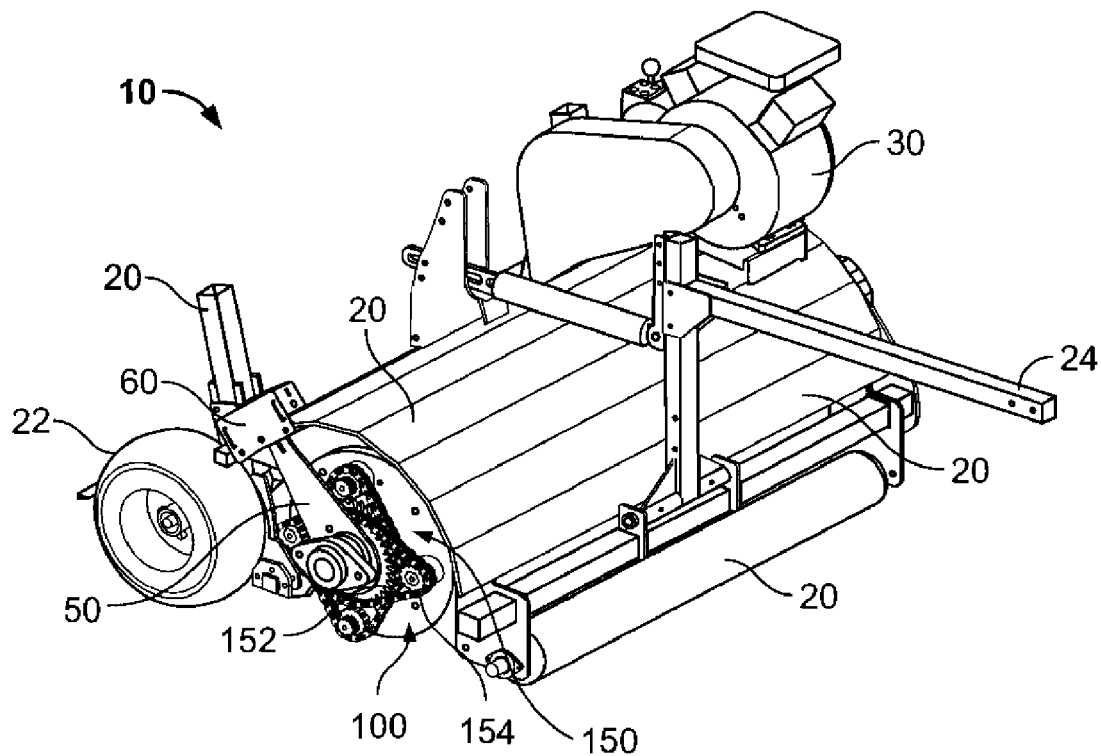
FIG. 1 is a perspective view of an aerator in accordance with an embodiment of the invention.

Referring to FIG. 1, an aerator 10 includes an aeration subassembly 100 coupled to a frame 20. Two or more wheels 22 are movably coupled to the frame 20, and a towing portion 24 of the frame 20 is adapted for connection to a utility vehicle (such as a tractor) so that the aerator 10 may be moved over a ground surface. In the depicted embodiment, the towing portion 24 includes a shaft configured to receive a one-point towing coupling, such as a ball-hitch device. Other aerator embodiments may include a towing portion 24 having a three-point hitch device. A gasoline motor 30 supplies rotational power to operate the aeration subassembly 100 as the aerator 10 is guided over the ground surface. As shown in FIG. 1, the motor 30 may include motor that is mounted to the frame 20, but other embodiments of the drive means may include a rotating drive shaft that extends from the utility vehicle. Thus, while the aerator 10 is moved over the ground surface by way of the utility vehicle, the aeration subassembly 100 operates to form aeration pockets in the ground surface.

Still referring to FIG. 1, a gear system 150 is coupled to the aeration subassembly 100 to guide the desired motion of the aeration tines (a side panel has been removed from the aerator 10 to better show the aeration subassembly 100). A sun gear 152 is axially aligned with a central support member of the aeration subassembly 100. The sun gear 152 is mounted to a timing member 50, which is in turn coupled to the frame 20 (via an energy modulator system 60). As such, the sun gear 152 remains substantially stationary relative to remainder of the aeration subassembly 100. Each planetary gear 154 is coupled to a corresponding tine rack of the aeration subassembly 100, so the planetary gears 154 revolve around the sun gear 152 as the aeration subassembly 100 rotates. The movement of the planetary gears 154 relative to the sun gear 152 provides the desired motion of the aeration tines in the aeration subassembly 100.

Figure 2:
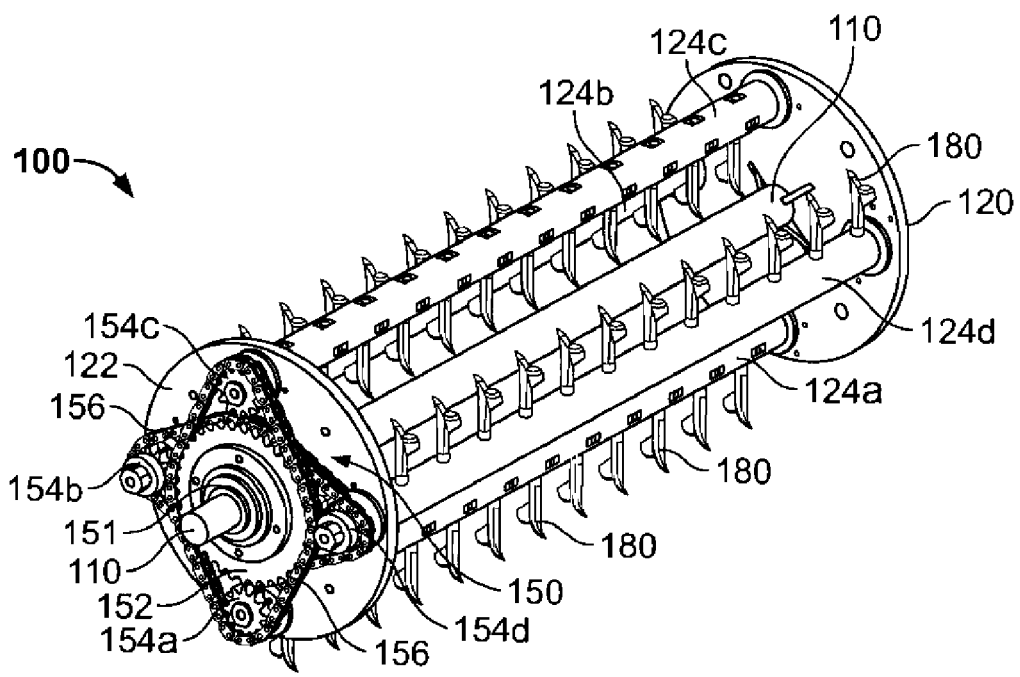
FIG. 2 is a perspective view of an aeration apparatus from the aerator of FIG. 1.
Figure 3:
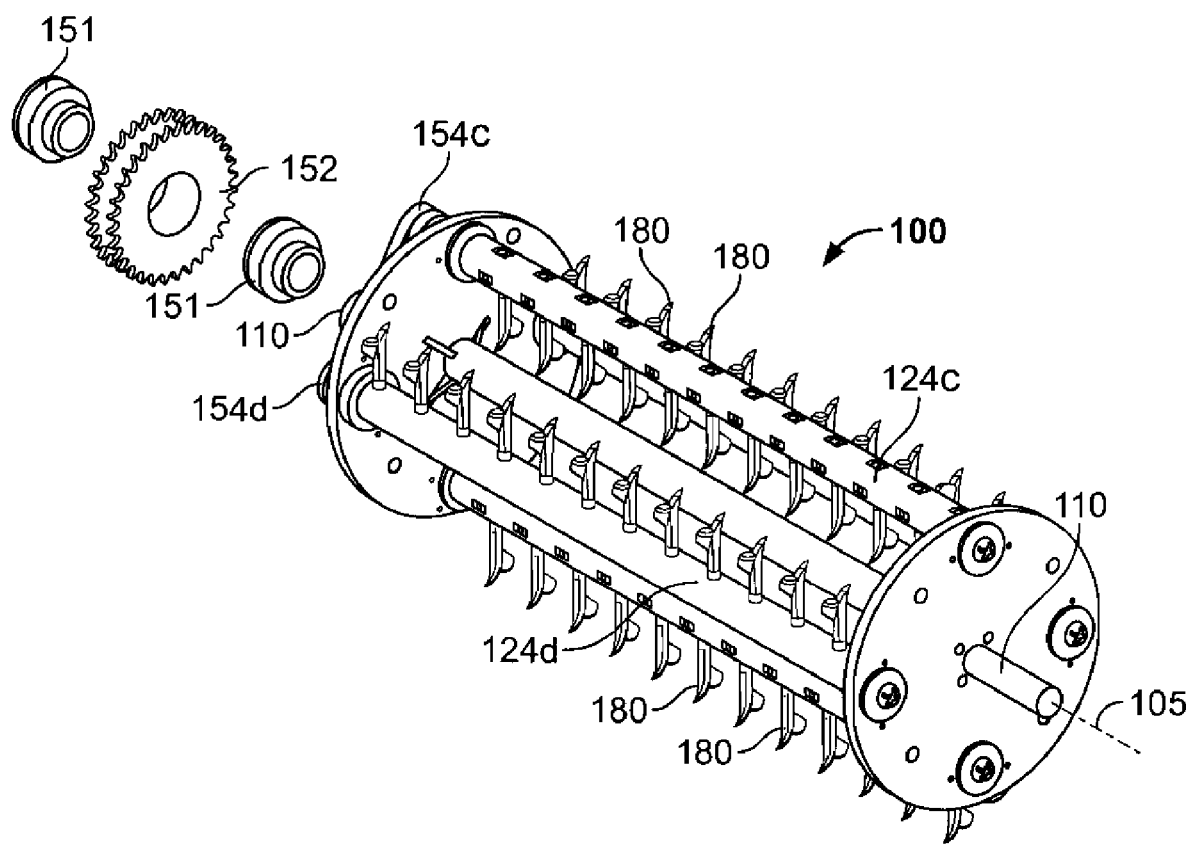
FIG. 3 is a partially exploded view of the aeration apparatus of FIG. 2.

Referring to FIGS. 2-3, the aeration subassembly 100 includes a pair of opposing carriers 120 and 122 that are fixedly engaged to the central support member 110. Tine racks 124*a-d* are rotatably engaged with the carriers 120 and 122 and positioned substantially parallel to the central support member 110. As such, each tine rack 124*a-d* may revolve around a central axis 105 (best shown in FIG. 3) while simultaneously rotating about its own axis. One or more aeration tines 180 are removably mounted to each tine rack 124*a-d*. Each aeration tine 180 extends substantially in a radial direction from the tine rack and is capable of penetrating a ground surface as the tine rack travels near the ground surface. Each planetary gear 154*a-d* is axially aligned with and coupled to a corresponding tine rack 124*a-d* such that rotation of the planetary gear (e.g. 124*d*) causes the corresponding tine rack (e.g., 154*d*) to rotate about its own axis.

The planetary gears 154*a-d* are engaged with the sun gear 152 using belts, chains, direct contact, or other gear interaction means. As previously described, the sun gear 152 is mounted to a timing member 50 (FIG. 1) to maintain the sun gear 152 in a substantially stationary position while the carriers 120 and 122 rotate. The sun gear is axially aligned with the central support member 110, and one or more bearings 151 are mounted between the sun gear 152 and the support member 110 so that the sun gear 152 may remain substantially stationary while the support member 110 rotates.

Still referring to FIGS. 2-3, the drive means 30 (FIG. 1) may be engaged with the support member 110 or one of the carriers 120 or 122 so as to force the carriers 120 and 122 to rotate about the central axis 105. When the carriers 120 and 122 rotate about the central axis 105, the tine racks 124*a-d* revolve around the central axis 105, which causes the planetary gears 154*a-d* to revolve around the sun gear 152. While the planetary gears 154*a-d* are revolving around the sun gear 152, the interaction of the gear system 150 causes each planetary gear 154*a-d* to rotate about its own axis. As a result, each tine rack 124*a-d* undergoes a compound motion (e.g., rotating about its own axis, revolving about a central axis 105, as well as being transported laterally across the ground surface by the tractor).

Figure 4:
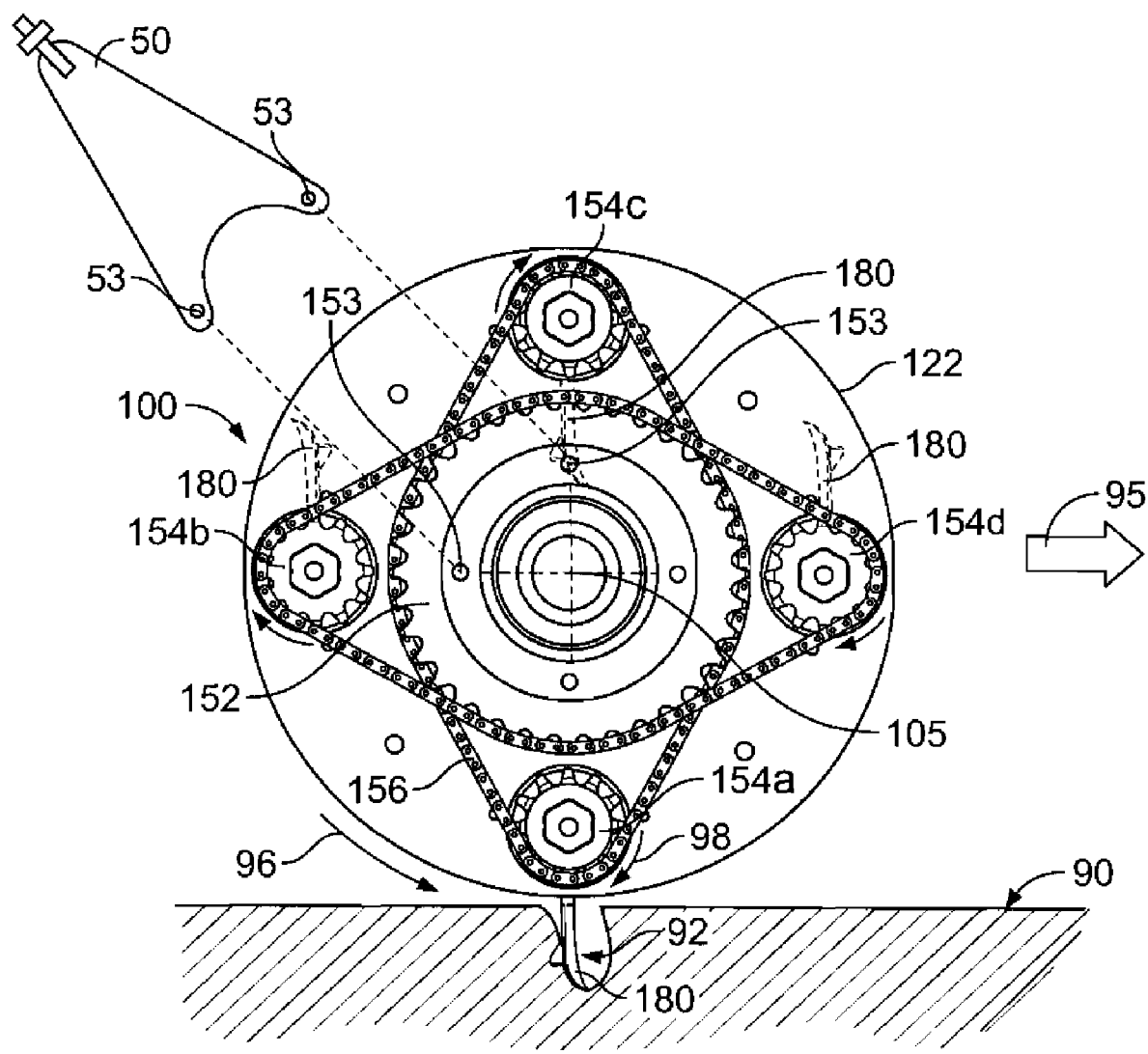
FIG. 4 is a side view of certain components from the aerator of FIG. 1.

Referring now to FIG. 4, the sun gear 152 is mounted to the timing member 50 by aligning the mounting holes 53 and 153 and securing a mechanical fastener therethrough. Because the timing arm 50 is coupled to the aerator frame 20, the sun gear 152 remains substantially stationary while the aeration subassembly 100 rotates. As shown in FIG. 4, the motor 30 (FIG. 1) causes the carriers 120 and 122 to rotate in a counter-clockwise direction about the central axis 105. Accordingly, the planetary gears 154*a-d* revolve in a counter-clockwise direction 96 about the sun gear 152. In response to the revolving motion 96, the gear system 150 causes each planetary gear 154*a-d* to rotate about its own axis in a clockwise direction 98. The revolving motion 96 and the rotating motion 98 are transmitted to the tines 180 because each tine rack 124*a-d* undergoes the same compound motion as the corresponding planetary gear 154*a-d*. By properly timing the revolving motion 96 and the rotating motion 98 of the planetary gears 154*a-d*, the aeration subassembly 100 is capable of positioning the tines 180 to penetrate the ground surface 90 and to create aeration pockets 92 in the ground surface 90.

Figure 5A:
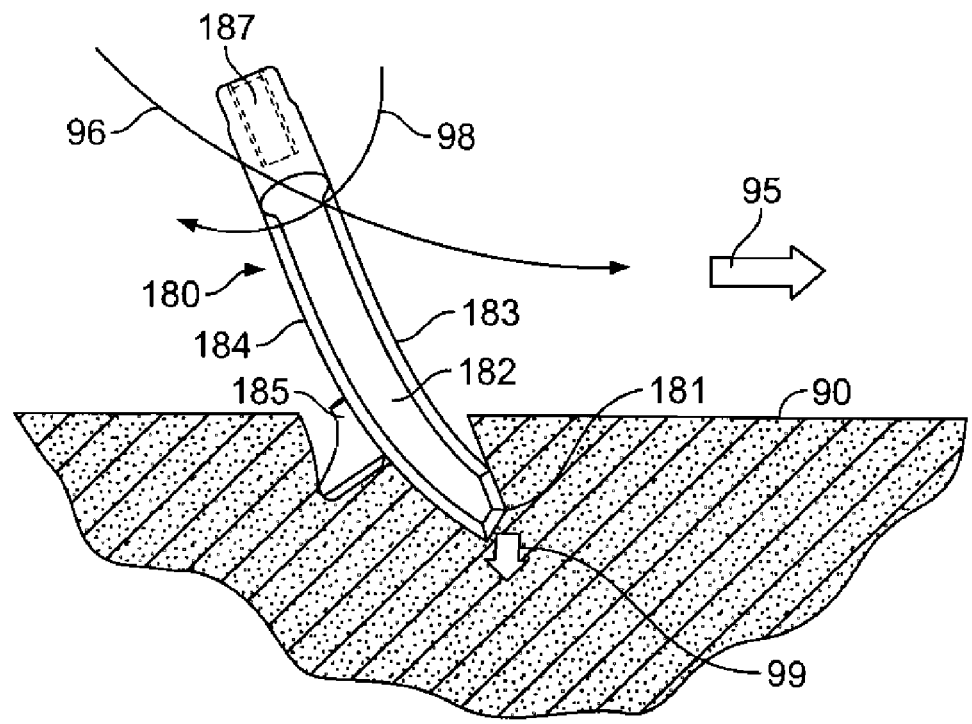
FIGS. 5A-B are side views of an aeration tine from the aerator of FIG. 1

Referring to FIG. 5A, one embodiment of an aeration tine 180 includes an arcuate portion 182 and an aeration tube 185 mounted thereto. The arcuate portion 182 includes a concave face 183 and a complimentary convex face 184. The concave and convex faces 183 and 184 are capable of fracturing soil when the tine 180 penetrates the ground surface 90. The aeration tube 185 is coupled to the arcuate portion 182 and is spaced apart from the tip portion 181. As such, the tip portion 181 penetrates the ground surface 90 before the aeration tube 185 engages the soil and cuts a plug from the ground. The aeration tine 180 may include a mounting means, such as a threaded cavity, to releasably mount onto a threaded stud on the tine rack 124*a-d*. When the utility vehicle moves the aerator 10 over the ground surface 90, a translation motion 95 is applied to the aeration subassembly 100. This motion 95, combined with the position of the tine 180 as it is guided toward the ground surface 90, causes the tip portion 181 to penetrate the ground surface 90. Depending on the relative rotational, revolution, and translational speeds the arcuate shape of the tine 180 may cause a plowshare effect that imposes a force 99 (having a downward component) from the soil to the tine 180.

Figure 5B:
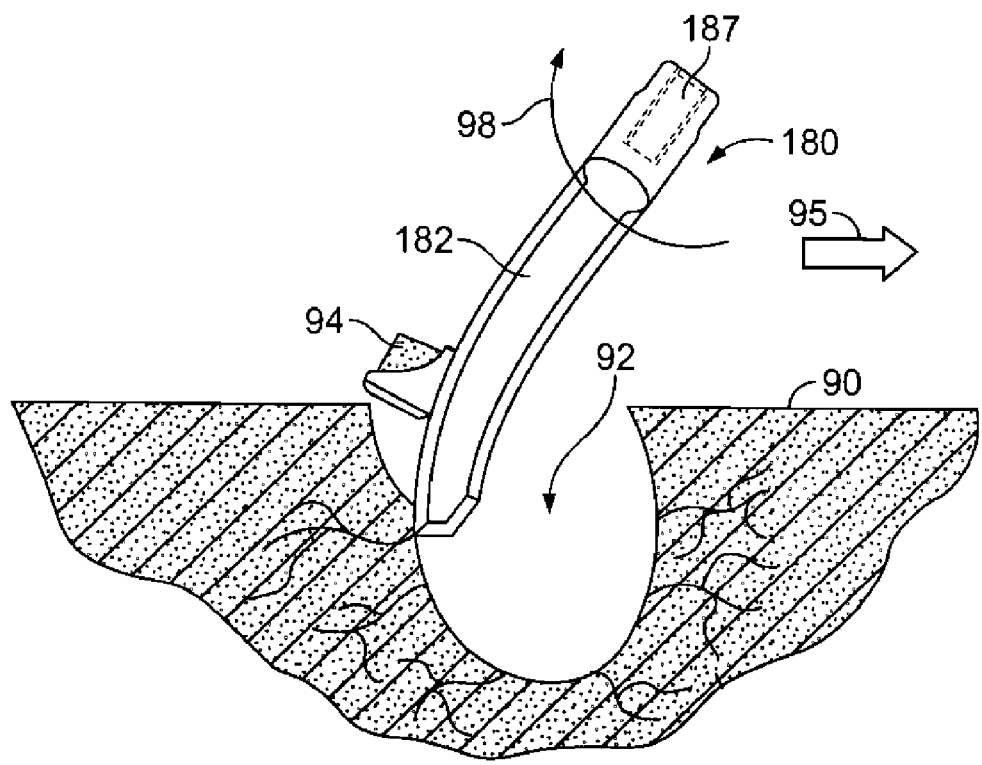

Referring to FIG. 5B, as the rotating motion 98 of the planetary gears 154*a-d* causes the tine to sweep out an aeration pocket 92, the aeration tube 185 operates to cut and remove a soil plug 94 from the ground surface 90. The aeration tube 185 has a conically tapered surface that engages the soil to cut a soil plug 94 as the tine 180 forms the aeration pocket 92. The aeration tube 185 removes a soil plug of substantially smaller volume in comparison to the conventional end-coring method. Accordingly, the ground surface 90 may not require subsequent treatment (as by mowing) to break apart the soil plugs form during the aeration process. The aeration tine 180 can thus be advantageously implemented to significantly reduce maintenance expenditures (and, in some circumstances, golf course downtime) associated with aeration procedures.

Figure 6A:
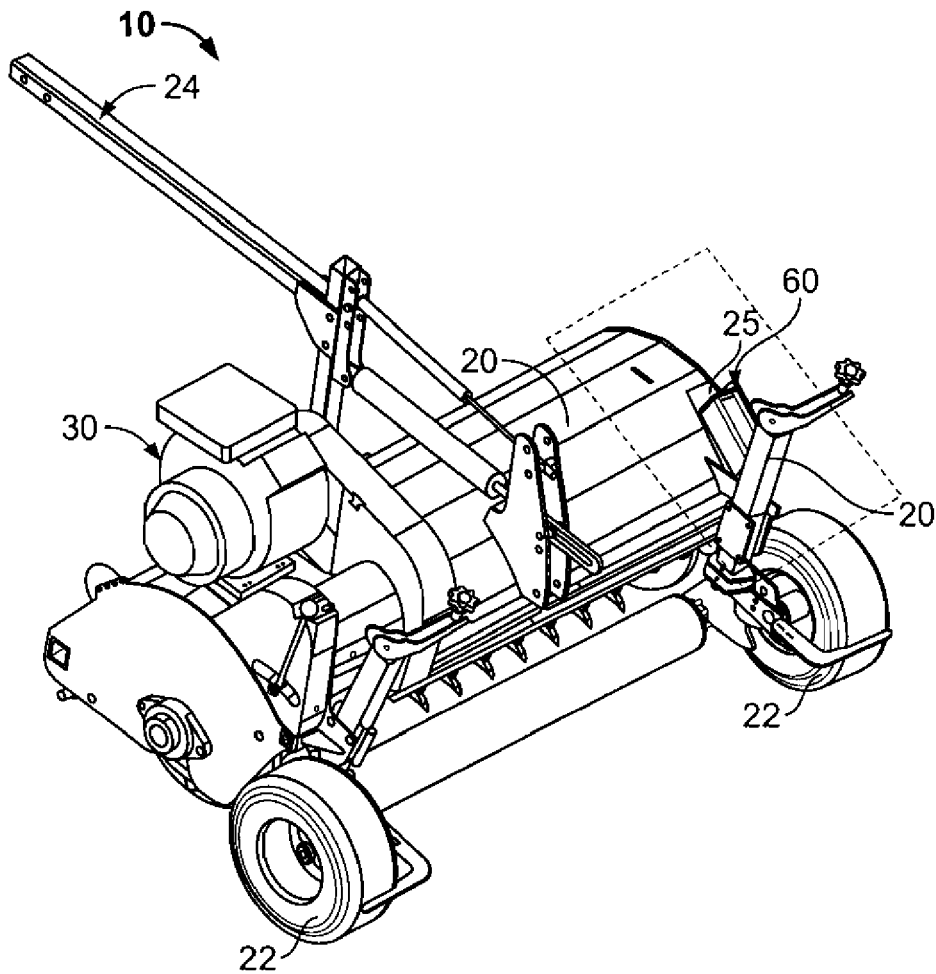
FIG. 6A is another perspective view of the aerator of FIG. 1.
Figure 6B:
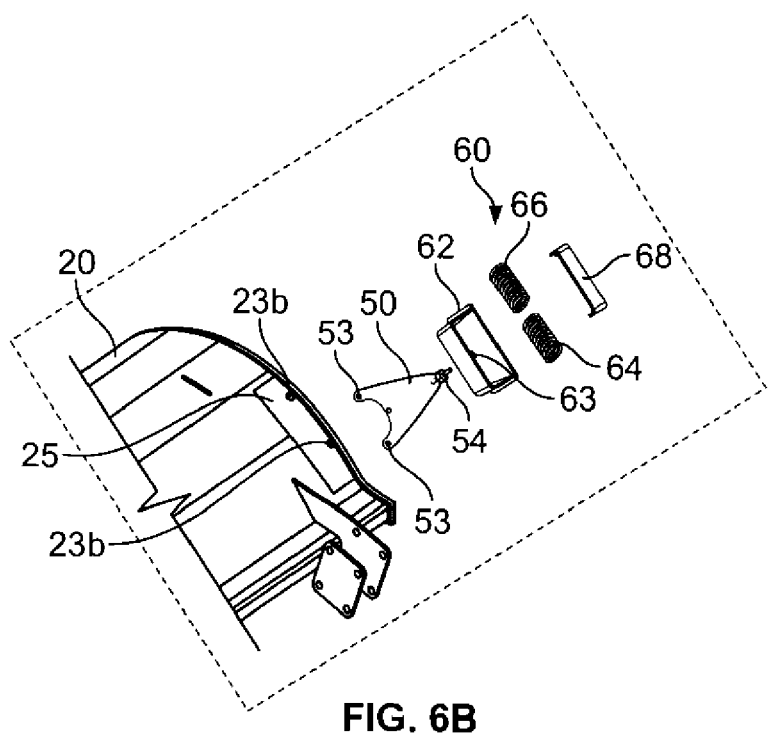
FIG. 6B is an exploded view of a portion of the aerator of FIG. 6A.

Referring to FIGS. 6A-B, the aerator 10 includes a system 60 that is capable of providing relief to the gear system when the aeration tine 180 impacts and penetrates a ground surface. In some circumstances, such a system 60 may utilize the energy from the tine's impact with the ground to load a spring device and subsequently unload that spring device, providing a "flicking" motion near the end of the aeration pocket formation. As previously described, the aeration subassembly 100 is engaged with the sun gear 152, which is mounted to the timing member 50 (as perhaps best shown in FIG. 4). When the aeration subassembly 100 sustains a sudden shock from one or more tines 180 impacting a hardened portion in the ground, that shock may be transmitted from the tines 180, to the tine rack 124a-d, and then to the gear system 150. Depending on the severity of the impact, some components of the gear system 150 may be damaged. However, the energy modulation system 60 permits the sun gear 152 (and the timing member 50) to slightly adjust, which provides relief to the gear system 150 when a substantial impact is sustained.

Referring to FIG. 6B, which shows the energy modulation system 60 in more detail, the energy modulation system 60 includes the timing member 50 assembled into an enclosure 62 such that an engagement portion 54 of the timing member is substantially inserted into the enclosure 62. A spring 64 and a complimentary spring 66 are positioned in the enclosure 62 so that the engagement portion 54 is positioned between each spring device 64 and 66. The enclosure may having an opening or slot in the bottom surface so that the engage portion may be inserted into the enclosure 62. The spring devices 64 and 66 may be metallic coiled springs, a solid material having a sufficient degree of elasticity, a gas spring, or the like. Furthermore, the spring device 64 and the complimentary spring device 66 are not necessarily the same type. A cover piece 68 may be used to substantially cover the engagement portion 54 and the spring devices 64 and 66. The enclosure 62 is configured to fit into a slot opening 25 in the frame 20, and a key 63 (e.g. a cotter pin) that extends laterally from the enclosure 62 may fit into one or more keyholes 23a-b in the frame 20. As such, the enclosure 62 may be adjusted from a first position where the key 63 is fitted into the keyhole 23a to a second position where the key 63 is fitted into a second keyhole 23b. As explained later in connection with FIGS. 10-11, such an adjustment may be used to shift the timing routine of the gear system 150, which may have the effect of retracting the tines 180 from contact with the ground surface 90.

Figure 7:
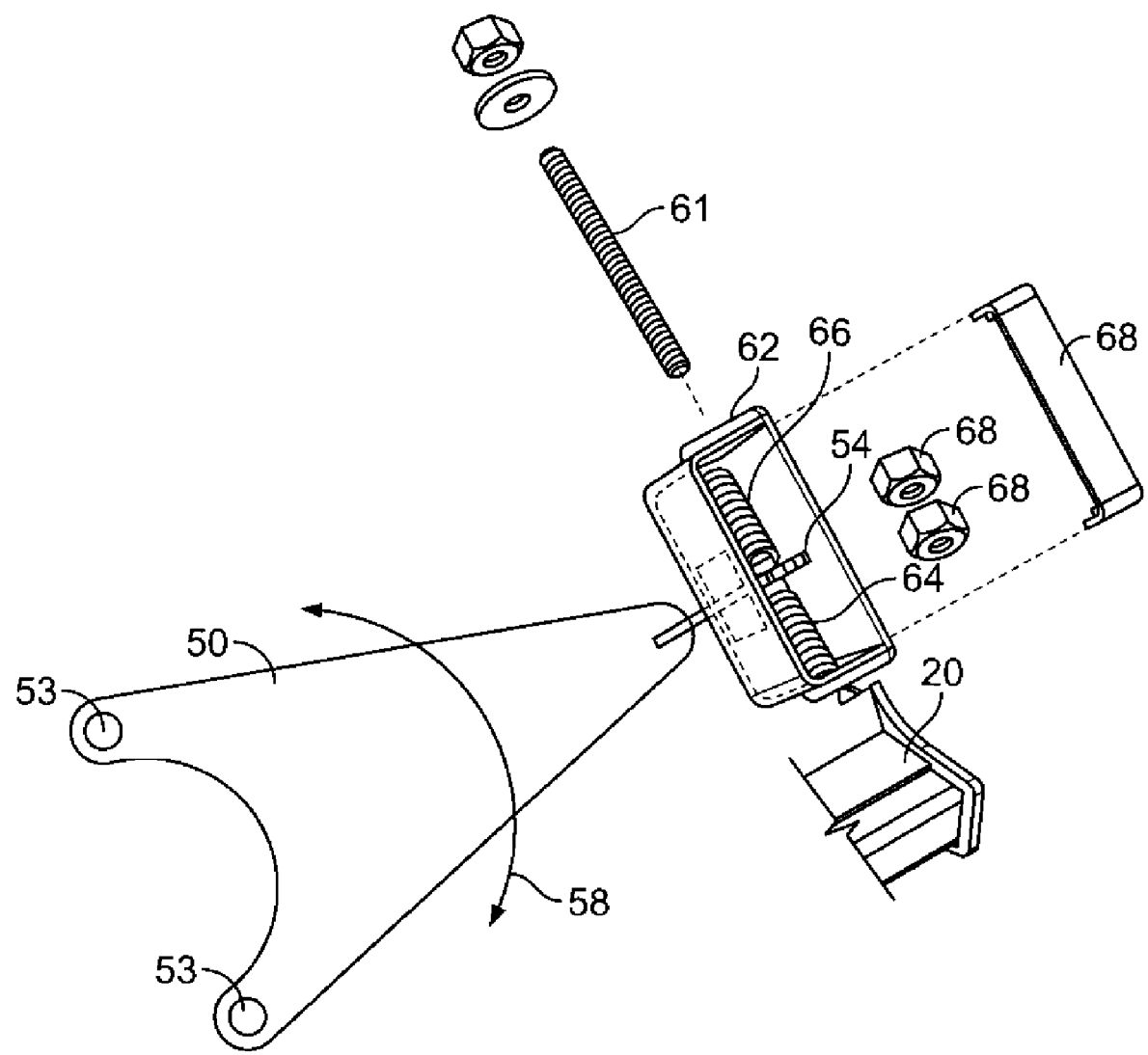
FIG. 7 is a partially exploded view of certain components of the aerator of FIG. 1, in accordance with an embodiment of the invention.

Referring now to FIG. 7, which shows the energy modulation system 60 in more detail, the engagement portion 54 and the spring devices 64 and 66 are retained in the enclosure 62 by a threaded shaft 61. The engagement portion 54 and the spring devices 64 and 66 are designed to slide over the shaft 61 while not necessarily engaging the threads. Adjustment nuts 67 engage the threads of the shaft 61 and may be turned to shift the steady-state position of the engagement portion 54, which incrementally shifts the position of the sun gear 152 and the orientation of the tines 180.

Still referring to FIG. 7, the timing member 50 is mounted to the sun gear 152 (FIG. 4) via the mounting holes 53. The timing member may rest in a steady-state position such that the engagement portion 54 is maintained in a substantially stationary position between the spring devices 64 and 66. In response to a substantial impact transmitted from the tines 180, the sun gear may be compelled to slightly rotate, so the timing member 50 would swing a modest distance in a rotational direction 58 to provide relief to the gear system 150 (FIG. 4). When the timing member 50 moves in the direction 58, the engagement portion 54 compresses one of the spring devices 64 or 66. When the impact sustained by the gear system 150 subsides, the compressed spring device 64 or 66 forces the engagement portion 54 back to its steady-state position, which causes the sun gear to quickly adjust back to its original position and ultimately causes the tines 180 to quickly return to normal timing position.

Figure 8:
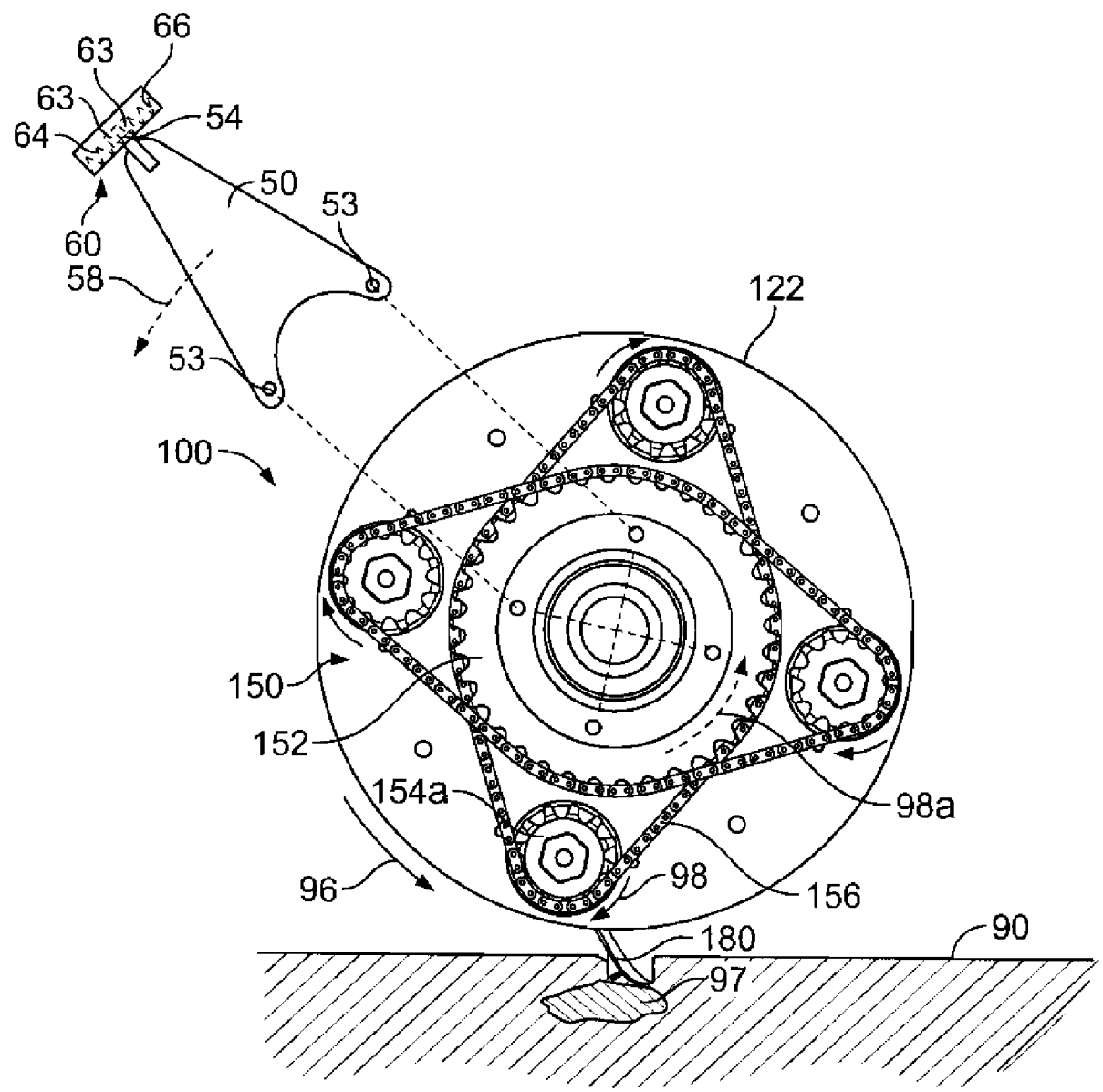
FIG. 8 is a side view of the aerator components of FIG. 7 and the aeration apparatus of FIG. 2.

For example, referring to FIG. 8, the tine 180 may undergo the revolving motion 96 and the rotational motion 98 (as explained in connection with FIGS. 4-5) to penetrate the ground surface 90 and create an aeration pocket. If, however, the tine 180 impacts a hardened portion 97 (e.g., a rock, compacted soil, or the like) in the ground, the rotational motion 98 of the tine 180 would be stunted even though the revolving motion 96 may continue. This effect would momentarily prevent the planetary gear 154a from rotating in the direction 98. In such a circumstance, the chain 156 would compel the sun gear 152 to slightly rotate in the direction 98a. Because the sun gear 152 is mounted to the timing member 50, the timing member would move in the direction 58, which would cause the engagement portion 54 to compress the spring device 64. By permitting the sun gear 152 to slightly move, the energy modulation system 60 provides relief to the gear system 150 when the aeration subassembly 100 sustains a substantial impact that might otherwise cause damage to the tine 180, the sun gear 152, the planetary gear 154a, or the chain 156.

Moreover, the compression of the spring device 64 may be used to advantageously store a portion of the impact energy until the tine 180 has nearly formed the aeration pocket 92 (refer to FIG. 5B), at which point the stored energy may release to cause the tine 180 to accelerate in the rotational direction 98. Such a "flicking" motion of the tine 180 may help to disperse the soil plug 94 that was cut during the formation of the aeration pocket 92, may tend to improve the cutting operation of the tine 180 so as to reduce disruption of turf and soil around the aeration pocket. Returning to the example described above in connection with FIG. 8, the tine 180 may fracture the hardened portion 97 to form an aeration pocket 92 and to cut a soil plug 94. At some point after the tine's initial impact, the tine's motion path may be less restricted, in which case the compression of the spring device 64 caused by the tine's initial impact would be released and the timing member 50 would be forced to the steady-state position (before it moved in the direction 58). This motion would cause the sun gear 152 to slightly rotate back to its original position (before it rotated in the direction 98a), so the planetary gear 154a would be forced to move back to its normal timing routine (e.g., the planetary gear 154a would quickly move in the direction 98). This return to the normal timing routine would cause the tine 180 to quickly move in the rotational direction 98, which has the effect of a "flicking" motion that may disperse the soil plug 94 cut from the ground and otherwise improve the effectiveness of the tine's cutting operation.

Figure 9:
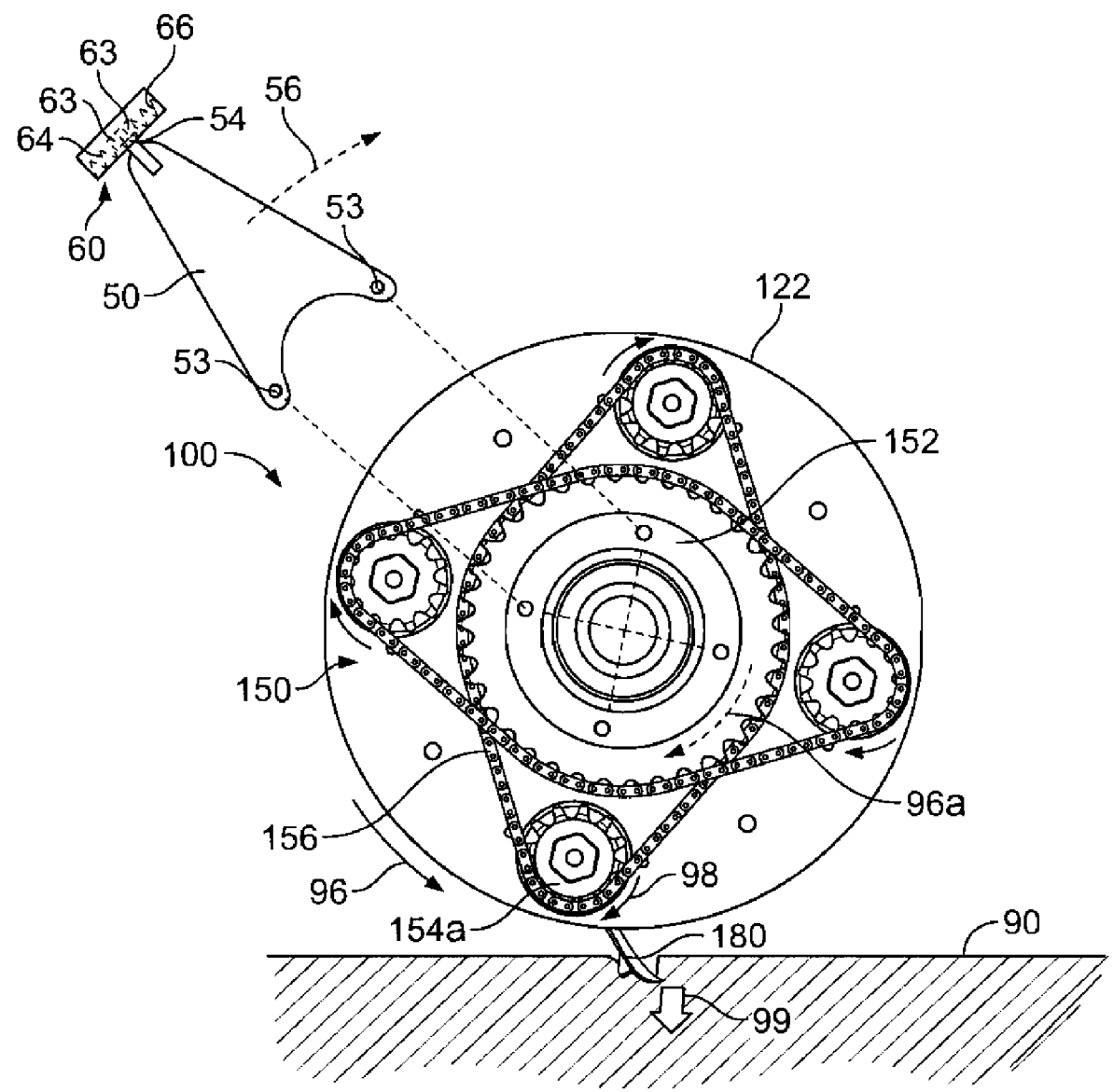
FIG. 9 is a side view of the aerator components of FIG. 7 and the aeration apparatus of FIG. 2.

Referring to FIG. 9, the energy modulation system 60 may provide bi-directional relief to the gear system 150. As previously explained in connection with FIG. 8, the energy modulation system 60 may permit the sun gear 152 to slightly rotate in the direction 98a, but the energy modulation system may also provide relief to the gear system 150 if the sun gear is compelled to slightly rotate in a different direction 96a. For example, the tine 180 may undergo the revolving motion 96 and the rotational motion 98 (as explained in connection with FIGS. 4-5) to penetrate the ground surface 90 and create an aeration pocket. The forces on the tine 180 (e.g., the plowshare effect force 99 or the like) as it penetrates the ground surface may cause the revolving motion 96 to be stunted, even though the rotating motion 98 may continue. This effect would momentarily hinder the planetary gear 154a from revolving about the sun gear 152 in the direction 96 according to the normal timing routine of the gear system 150. In such a circumstance, the chain 156 would compel the sun gear 152 to slightly rotate in the direction 96a. Because the sun gear 152 is mounted to the timing member 50, the timing member would move in the direction 56, which would cause the engagement portion 54 to compress the spring device 66.

By permitting the sun gear 152 to slightly move in either direction 96a (FIG. 9) or 98a (FIG. 8), the energy modulation system 60 provides relief to the gear system 150 when the ground penetration of the aeration tine 180 momentarily hinders the normal timing routine of the gear system. Such a situation might otherwise cause damage to the tine 180, the sun gear 152, the planetary gear 154a, or the chain 1 56.

Figure 10:
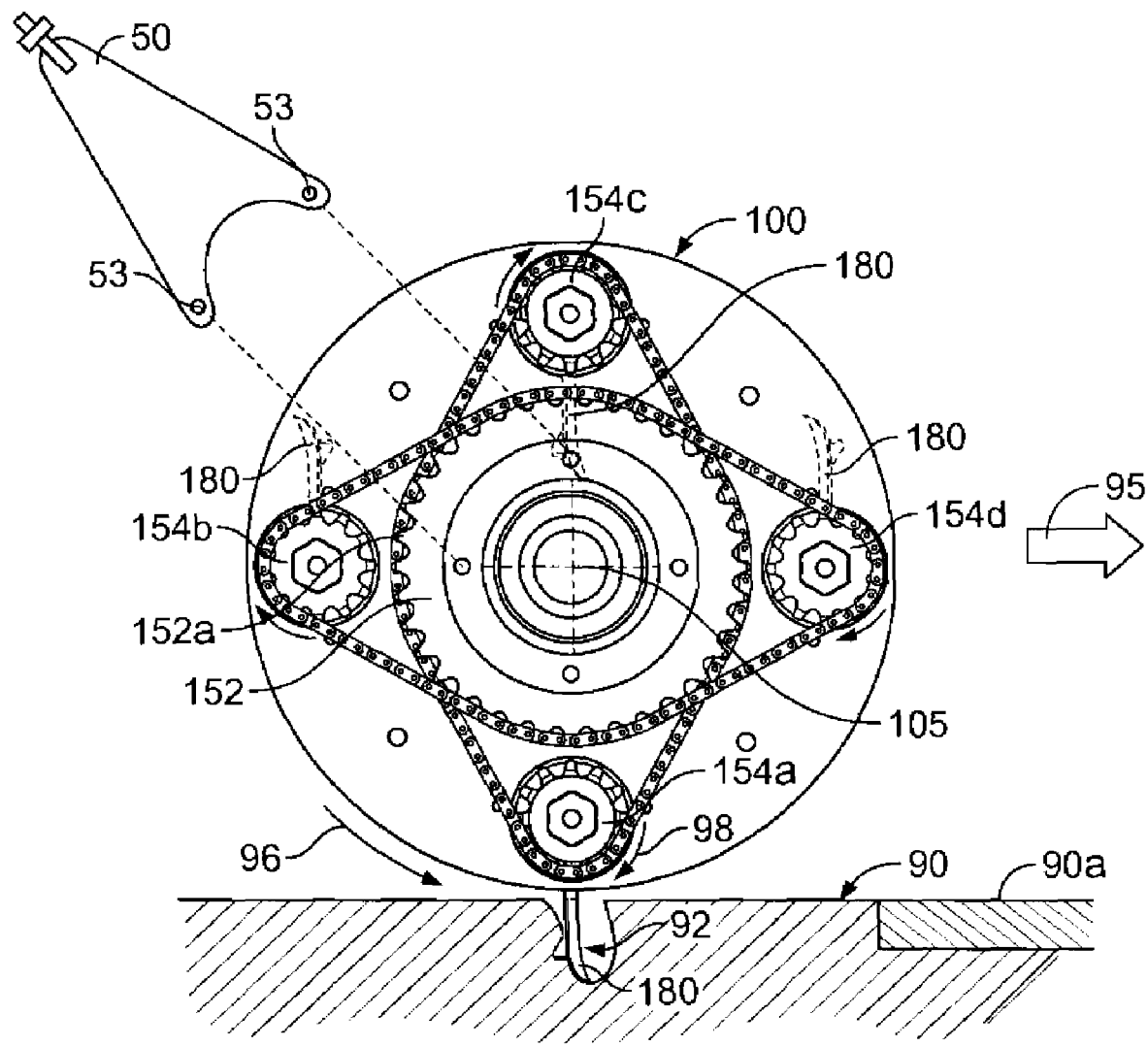
FIG. 10 is a side view of certain components of the aerator of FIG. 1.
Figure 11:
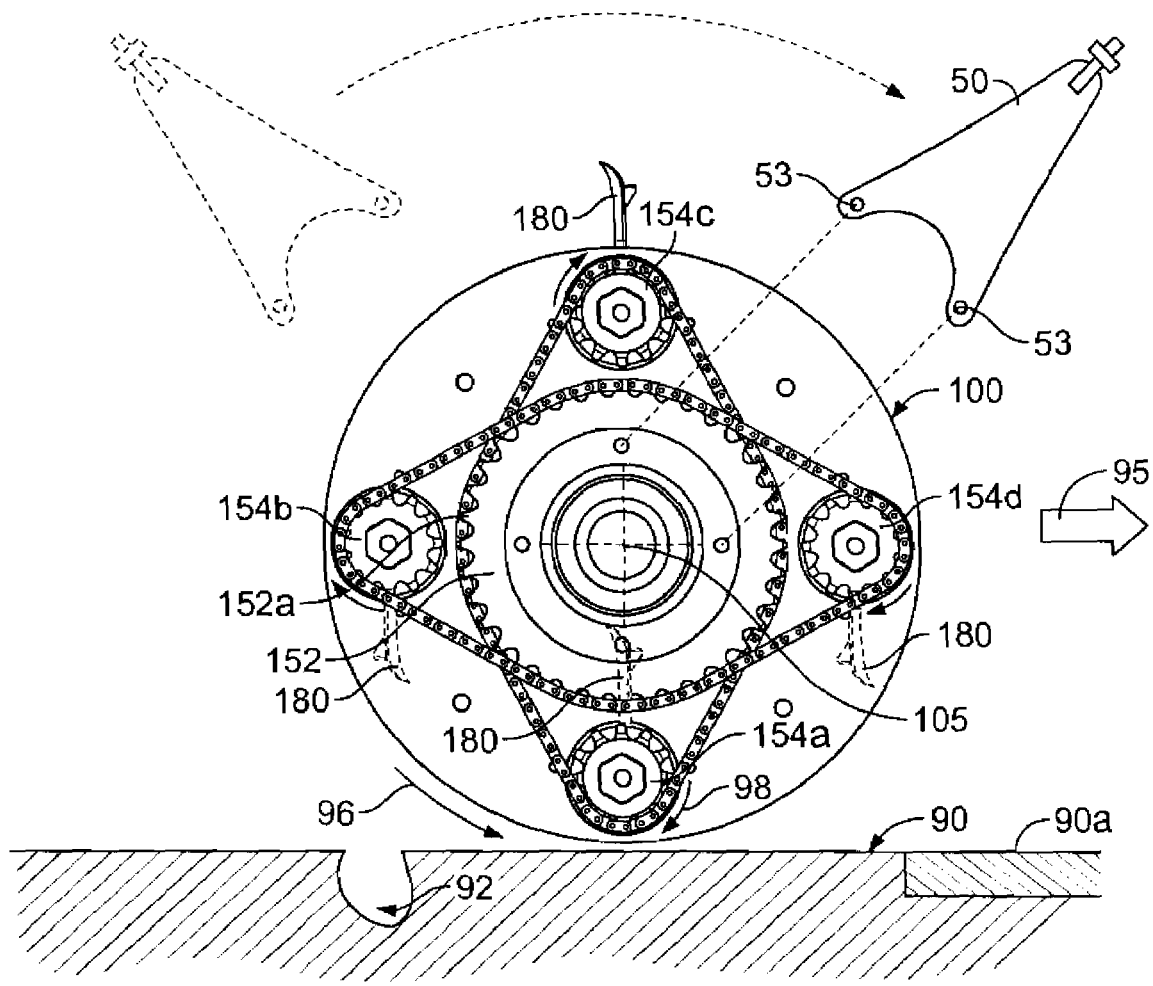
FIG. 11 is a side view of the aerator components of FIG. 10.

Referring now to FIGS. 10-11, the timing member 50 may be adjusted from a first position to a second position, which causes a shift in the timing routine of the gear system 150. Such a shift in the timing routine of the gear system 150 may have the effect of "retracting" the tines 180 from contact with the ground surface 90. This tine retraction may be accomplished without lifting the entire aerator 10 from the ground. Rather, the aerator wheels 22 may continue to roll over the ground surface 90 even through the tines 180 do not contact the ground. Moreover, the tine retraction may be accomplished while the aerator is operating, thus providing an on-the-fly ability to retract the tines 180 from contact with the ground surface 90 without the need to lift the entire machine.

Referring to FIG. 10, the sun gear 152 is mounted to the timing member 50 using fasteners secured through mounting holes 53. As such, the sun gear 152 remains substantially stationary while the carrier 122 causes the planetary gears 154a-d to revolve about the sun gear 152. The timing member 50 is adjustably coupled to the aerator frame such that the timing member 50 is in a first position relative to the frame. When the timing member 50 is in this first position, the tines 180 on the tine racks 124a-d operate to form aeration pockets 92 just as described in connection with FIGS. 4-5. The tine racks 124a-d follow a revolving motion 96 as the planetary gears 154a-d cause the tine racks 124a-d to rotate about their own axis in a rotation direction 98. As each tine rack 124a-d is drawn near to the ground surface, the tines 180 are positioned in such a manner to penetrate the ground surface 90 and form aeration pockets 92. As the utility vehicle moves the aerator 10 in the forward direction 95, the aeration subassembly 100 may be moved over a non-aeratable surface 90a, such as a concrete sidewalk adjacent to a golf course fairway. Such a surface 90a is not intended for aeration, and the operator must either avoid moving over such a surface 90a or prevent the tines 180 from contacting the non-aeratable surface 90a.

Referring to FIG. 11, the timing member 50 may be moved to a second position so that the tines 180 are shifted to avoid contact with the ground. As the aerator 10 proceeds in the forward direction 95, the operator may cause the timing member 50 to shift from the first position (shown in dotted lines) to the second position, which causes the sun gear 152 to rotate a particular amount (compare the orientation of marker tooth 152a in FIG. 10 and in FIG. 11). When the sun gear 152 rotates to this new position, the timing routine of the planetary gears 154a-d is shifted such that the tines 180 near ground surface are shifted 180-degrees away from the ground. Because the timing routine of the gear system 150 was shifted, the tines 180 do not rotate to a position extending downward toward the ground surface 90 until after the tine rack is sufficiently elevated above ground, thus preventing the tines 180 from contacting the ground surface 90. This has the effect of retracting the tines 180 (that are mounted on the tine rack proximal to the ground surface) to a position away from the ground surface without the need for lifting the entire aerator 10 off the ground. Such a feature is advantageous when the aerator 10 proceeds in the forward direction 95 toward a non-aeratable surface 90a. In such a case, the operator may cause the timing member 50 to be shifted from the first position to the second position so that the tines 180 are retracted to a position that prevents contact with the non-aeratable surface 90a.

In the embodiment depicted in FIG. 11, the shifting of the timing member 50 resulted in the sun gear 152 to shift by about 60-degrees (compare the orientation of marker tooth 152a in FIG. 10 and in FIG. 11). It should be understood, however, that different amounts of timing member/sun gear movements are necessary depending upon the gear ratio of the gear system 150 and other dimensions of the aerator system.

In addition, the tine-retracting feature described in connection with FIGS. 10-11 may be used in combination with the energy modulation system 60. Referring back to FIGS. 6A-B, the timing member 50 may be coupled to the enclosure 62 of the energy modulation system 60, which is, in turn, coupled to the frame 20. In such circumstances, the timing member 50 may be shifted from the first position to the second position (FIG. 11) by adjusting the position of the enclosure 62. In one example, the enclosure 62 may be adjusted from a first position where the key 63 is fitted into the keyhole 23a to a second position where the key 63 is fitted into a second keyhole 23b. Thus, the enclosure 62 is slid a particular distance along the slot opening 25 in the frame 20 (FIGS. 6A-B), which results in the timing member 50 being shifted from the first position to the second position (FIG. 11). Alternately, the enclosure 62 may be moved along slot 25 by a pneumatic cylinder, servo motor, or other automatic means. Still other actuation options include a spring to laterally bias pins projecting from enclosure 62 into the keyholes. A suitable handle member can be attached to the enclosure 62 to permit a user to release the pins from the keyholes, slide the enclosure to a desired timing position, and then permit the pins to re-seat into the keyholes.

The shifting of the timing member 50 from the first position to the second position may be accomplished in any number of ways. As previously described, a key/keyhole system may be used to manually adjust and secure the position of the timing member 50. Similarly, a notch/groove system may be used to manually adjust and secure the position of the timing member 50. In another example, an actuator, such as a hydraulic or pneumatic-powered actuator, may be mounted to the frame 20 and used to control the position of the timing member 50. In such circumstances, the operator of may control the actuator while seated on the utility vehicle, thus permitting the operator to retract the tines away from the ground surface while driving the utility vehicle.

A number of embodiments of the invention have been described. Nevertheless, it will be understood that various modifications may be made without departing from the spirit and scope of the invention.

What is claimed is:

1. An aerator comprising:
   an aeration subassembly movably coupled to a frame and having an aeration tine mounted to a tine rack, the aeration tine being operable to form an aeration pocket in a ground surface; and
   a gear system that is adjustable between a first timing position and a second timing position, the gear system being coupled to the aeration subassembly to guide at least a portion of the aeration tine's motion to penetrate and exit the ground surface at different orientations when forming the aeration pocket;
   wherein, when the gear system is adjusted to the first timing position, the aeration tine is operable to contact the ground surface; and wherein, when the gear system is adjusted to the second timing position, the aeration tine is operable to avoid contact with ground surface.

2. The aerator of claim 1, wherein the aeration tine is operable to avoid contact with the ground surface without lifting the frame away from the ground surface.

3. The aerator of claim 1, further comprising a timing member mounted to at least one gear of the gear system, wherein the timing member is adjustable between a first operative position and a second operative position.

4. The aerator of claim 3, wherein the gear system is in the first timing position when the timing member is adjusted to the first operative position, and wherein the gear system is in the second timing position when the timing member is adjusted to the second operative position.

5. The aerator of claim 3, wherein the timing member is manually adjustable between the first operative position and the second operative position.

6. The aerator of claim 3, further comprising an actuator to adjust the timing member's position, the actuator being controlled from a towing vehicle.

7. The aerator of claim 1, wherein the gear system is a planetary gear system having at least one planetary gear engaged with a sun gear, the planetary gear being coupled to the tine rack.

8. The aerator of claim 7, wherein a timing member is coupled to the sun gear of the gear system.

9. The aerator of claim 8, wherein the timing member is operable to shift the steady-state position of the sun gear relative to the frame.

10. The aerator of claim 8, wherein the gear system is adjusted between the first and second timing positions by shifting the position of the sun gear.

11. The aerator of claim 1, wherein the gear system is selectively adjustable between the first timing position and the second timing position while the aeration subassembly proceeds in a forward direction over the ground surface.

12. The aerator of claim 11, wherein the gear system is selectively adjustable by a user to the second timing position while the aeration subassembly proceeds in the forward direction toward a non-aeratable surface.

13. An aerator comprising:
an aeration subassembly movably coupled to a frame and having an arcuate aeration tine mounted to a tine rack, the arcuate aeration tine being operable to form an aeration pocket in a ground;
a gear system coupled to the aeration subassembly, the gear system that imparts a rotational motion to the tine rack; and
an energy modulation system coupled to the gear system to provide bi-directional relief to the gear system, the energy modulation system having at least one spring device that is loaded when the aeration tine impacts a hardened portion in the ground,
wherein the gear system is adjustable between a first timing position and a second timing position, and when the gear system is adjusted to the second timing position, the arcuate aeration tine is operable to avoid contact with ground surface without lifting the frame away from the ground surface.

14. The aerator of claim 13, wherein the aeration tine accelerates along a non-linear path when the spring device shifts from a loaded state to a steady state.

15. The aerator of claim 13, wherein the gear system is a planetary gear system having a planetary gear engaged with a sun gear, the planetary gear being coupled to the tine rack.

16. The aerator of claim 15, wherein the energy modulation system is coupled to the sun gear such that the sun gear may shift positions when the aeration tine impacts the hardened portion.

17. The aerator of claim 16, wherein the energy modulation system includes a timing member having a proximal portion mounted to the sun gear and a distal portion that engages the at least one spring device.

18. The aerator of claim 17, the gear system is in the first timing position when the timing member is adjusted to a first operative position, and the gear system is in the second timing position when the timing member is adjusted to a second operative position.

19. The aerator of claim 18, wherein the timing member is operable to shift the steady-state position of the sun gear relative to the frame.

20. The aerator of claim 13, wherein, when the gear system is adjusted to the first timing position, the aeration tine is operable to contact the ground surface.

21. The aerator of claim 20, wherein the gear system is adjusted between the first and second timing positions by shifting the position of a sun gear.

22. The aerator of claim 13, wherein the arcuate aeration tine includes a concave face and a complementary convex face that extend toward a tip portion.

23. The aerator of claim 13, wherein the energy modulation system imparts a flicking motion to the arcuate tine when the at least one spring returns to a steady-state position.

24. The aerator of claim 13, wherein the energy modulation system comprises at least two spring devices so as to provide the bi-directional relief to the gear system.

25. The aerator of claim 13, wherein the gear system is selectively adjustable between the first timing position and the second timing position while the aeration subassembly proceeds in a forward direction over the ground surface.

26. The aerator of claim 25, wherein the gear system is selectively adjustable by a user to the second timing position while the aeration subassembly proceeds in the forward direction toward a non-aeratable surface.

* * * * *